United States Patent [19]

Kanno

[11] Patent Number: 4,690,516

[45] Date of Patent: Sep. 1, 1987

[54] PHOTOGRAPHING LENS BARREL PROVIDED WITH A CATADIOPTRIC OPTICAL SYSTEM

[75] Inventor: Hideo Kanno, Chiba, Japan

[73] Assignee: Nippon Kogaku K. K., Tokyo, Japan

[21] Appl. No.: 658,990

[22] Filed: Oct. 10, 1984

[30] Foreign Application Priority Data

Oct. 20, 1983 [JP] Japan .............................. 58-195224

[51] Int. Cl.[4] .......................... G02B 17/08; G02B 7/04
[52] U.S. Cl. ..................................... 350/444; 350/255
[58] Field of Search ............................. 350/442–444, 350/255

[56] References Cited

U.S. PATENT DOCUMENTS 3,671,109  6/1972  Sugano et al. ................. 350/442 X
4,445,756  5/1984  Komoto ........................ 350/444 X
4,523,816  6/1985  Kreitzer ....................... 350/444

Primary Examiner—John K. Corbin
Assistant Examiner—Scott J. Sugarman
Attorney, Agent, or Firm—Shapiro and Shapiro

[57] ABSTRACT

In a photographing lens, only a second dioptric system is moved in the direction of the optical axis for focusing while keeping constant the positional relation between a first dioptric system and first and second catoptric systems. The first catoptric system has a through-hole formed at the central area. The second dioptric system is moved within a range containing the through-hole and the area near the through-hole. A driving mechanism for moving the second dioptric system is so mounted as to pass through the first catoptric system. The driving mechanism includes a slide member and a movement-expanding member. The slide member is slidable in the direction along the optical axis interlocking with the motion of an operation member. The movement-expanding member expands the movement of the slide member and transmits the expanded movement to the second dioptric system.

11 Claims, 3 Drawing Figures

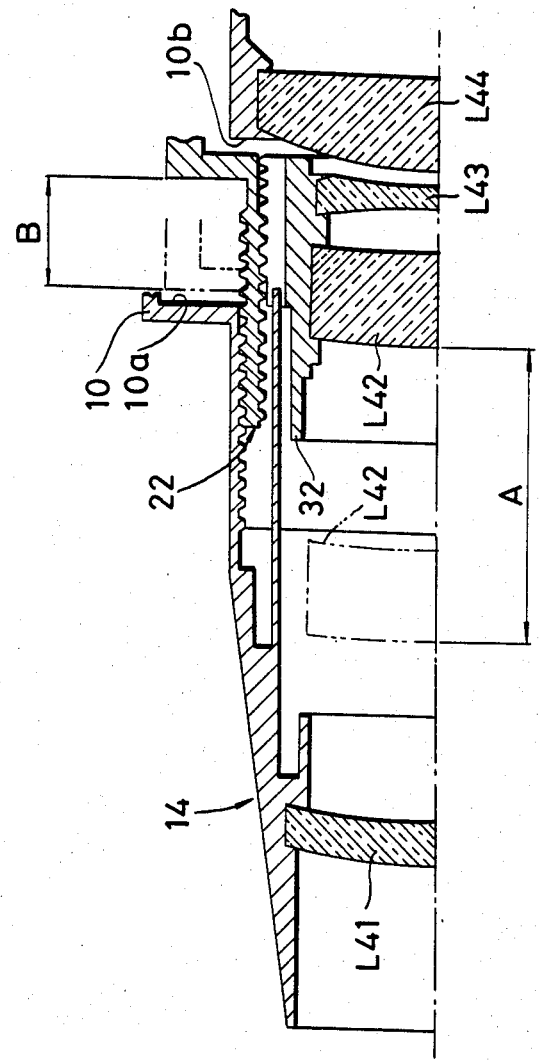

4,690,516

PHOTOGRAPHING LENS BARREL PROVIDED WITH A CATADIOPTRIC OPTICAL SYSTEM

BACKGROUND OF THE INVENTION

1. Field of the Invention

The present invention relates to a catadioptric optical system and especially to a lens driving apparatus thereof.

2. Description of the Prior Art

A catadioptric optical system is often used to obtain a compact structure of a telephoto lens of long focal length for a camera.

The photographing lens employing a catadioptric optical system generally comprises lens groups containing two reflective surfaces arranged at the light entrance portion and at the middle portion of the lens barrel. The optical system is constituted of four parts, which are, as viewed in the direction of the incident light, the first dioptric system, the first catoptric system, the second catoptric system and the second dioptric system.

For focusing of the above-mentioned type of optical system there have been known and used various focusing methods. For example, the following three different methods have been used. The first is to move the optical system toward the object as a whole. The second is to change the distance between the two reflective surfaces. The third is to change the distance between the reflective surfaces and the second dioptric system while keeping the distance between the two reflective surfaces constant.

The first focusing method involves some drawbacks. As the whole optical system is moved for focusing, the amount of movement required for focusing becomes larger for the optical system having longer focal length. Consequently, this method needs a large and heavy driving mechanism. In addition, the position of the center of gravity changes in the extreme by focusing. This is against the desire for easy operation.

According to the second focusing method, the amount of movement of the optical system required for focusing is relatively small. However, the lens elements to be moved are large-diametered lens elements. Therefore, this focusing method also needs a large driving mechanism the use of which is undesirable with respect to easy operability. Furthermore, as the reflective surface is moved for which the highest precision is required, there is often caused eccentricity of the reflective surface by the movement. Thus, it is difficult to maintain the optical performance of the optical system.

SUMMARY OF THE INVENTION

Accordingly it is the general object of the invention to provide a photographing lens with a catadioptric optical system which is light in weight and easy to operate and handle without the drawbacks of the prior art as mentioned above.

The photographing lens according to the present invention is provided with a lens driving apparatus employing the above-mentioned third focusing method. In the photographing lens, only the second dioptric system is moved in the direction of the optical axis for focusing while keeping constant the positional relation between the first dioptric system and the first and second catoptric systems. The first catoptric system has a through-hole formed at the central area. The second dioptric system is moved within a range containing the through-hole and the area near the through-hole. A driving mechanism for moving the second dioptric system is so mounted as to pass through the first catoptric system. The driving mechanism includes a slide member and a movement-expanding member. The slide member is slidable in the direction along the optical axis interlocking with the motion of an operation member. The movement-expanding member expands the movement of the slide member and transmits the expanded movement to the second dioptric system.

The application of the lens driving apparatus according to the invention is not limited to the driving of the above-mentioned type of optical system for focusing only. It can be used also to drive the second dioptric system for the change of magnification.

BRIEF DESCRIPTION OF THE DRAWINGS

FIGS. 1 through 3 show an embodiment of the invention, of which

FIG. 1 is a sectional view thereof with the optical system being in the position focused to infinity;

FIG. 2 is an enlarged view of the essential parts thereof; and

FIG. 3 is an enlarged view of the essential parts with the optical system being in the position focused to close distance.

DESCRIPTION OF PREFERRED EMBODIMENT

Figure 1:
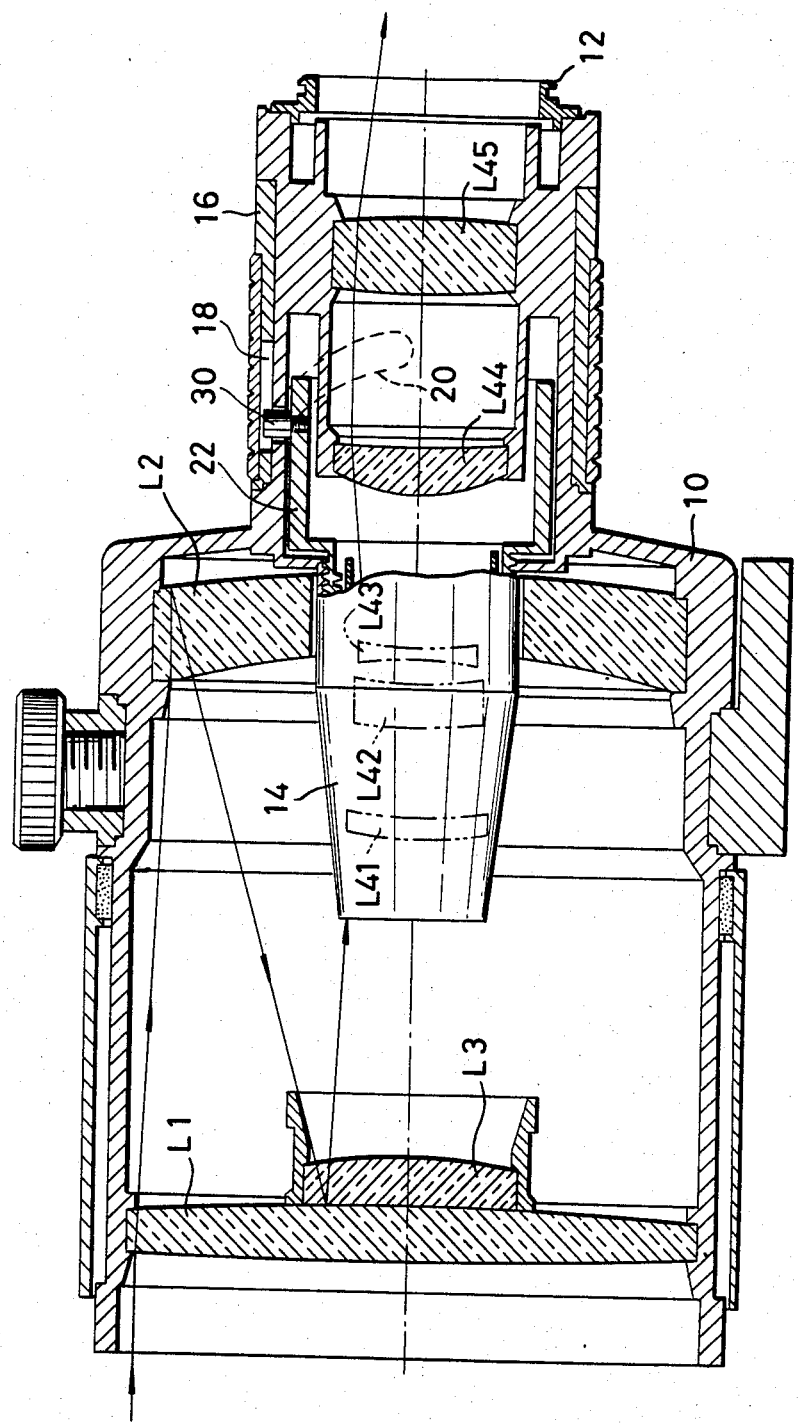

Referring to FIG. 1 showing an embodiment of the present invention, a stationary lens barrel 10 has a known mount 12 through which the lens barrel can be fixed to a camera housing. The lens barrel 10 contains a catadioptric optical system as will be described in detail under. The diameter of the lens barrel is large at the object side and small at the image side, i.e., the camera side.

Fixed to the lens barrel closest to the object is a large-diametered lens L1 which constitutes the first dioptric system of the catadioptric optical system. A reflecting mirror L2 constituting the first catoptric system of the optical system is fixed to the lens barrel at the middle of the latter. The reflecting mirror L2 comprises a large-diametered ring lens and a reflective surface provided on the rear lens surface. Cemented to the image side surface of the large-diametered lens L1 at the middle portion of the latter is a lens L3 having a reflective surface on the object side lens surface. The lens L3 constitutes the second catoptric system of the catadioptric optical system.

The second dioptric system of the catadioptric optical system comprises a first lens group consisting of lenses L41, L42, L43 and a second lens group consisting of lenses L44, L45. The lenses L41, L42 and L43 of the first group are arranged in an inner barrel 14 integrally formed with the lens barrel 10, passing through the ring-formed reflecting mirror L2. The lenses of the second group are arranged in the rear of the first group. The lens L41 of the first group and lenses L44 and L45 of the second group are all stationary lenses. The remaining two lenses L42 and L43 of the first group are moving lenses and can be moved in the direction of the optical axis for focusing.

An operation ring 16 with an axial linear slot 18 is on the outer circumference of the stationary lens barrel 10. The operation ring is rotatable about the optical axis. The lens barrel 10 has a spiral slot 20 formed in an area corresponding to the linear slot 18 of the operation ring.

Figure 2:
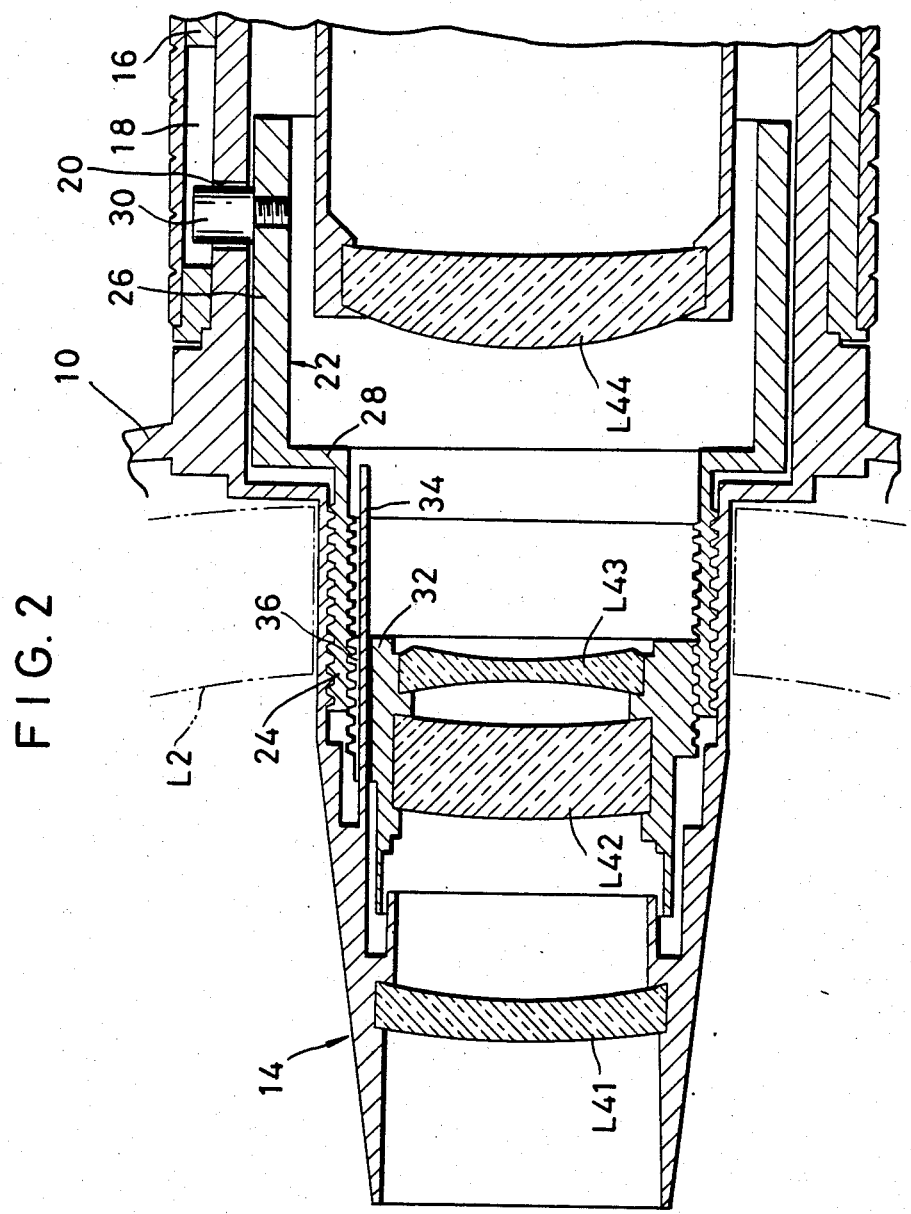

As seen best in FIG. 2, the inner barrel 14 within the stationary lens barrel has a female screw formed on the inner surface. The female screw of the inner barrel is in engagement with a male screw formed on a first slide ring 22 which can be rotated for focusing. The first slide ring 22 is composed of a small-diametered member 24 and a large-diametered member 26. The small-diametered member 24 is connected with the inner barrel 14 through the above screw-engagement and connected with the large-diametered member 26 by a ring-formed connection member 28. The large-diametered member 26 has a stud pin 30 which is engaged in the above-mentioned linear slot 18 and spiral slot 20. The small-diametered member 24 of the first slide ring 22 has also an internal screw engaging with an external screw of a second slide ring 32. The second slide ring 32 holds the moving lenses L42 and L43. The inner barrel 14 has a key plate 34 fixed to the inside of the barrel. The key plate 34 extends parallel to the optical axis and passes through a linear slot 36 formed in the second slide ring 32.

The light from an object (not shown) passes through the marginal area of the lens L1 and is reflected by the reflective surface of the reflecting mirror L2 toward the lens L3. The reflective surface of the lens L3 reflects the light toward the lens L41. Through lenses L42, L43, L44 and L45 the light is then transmitted to a film within the camera (not shown).

When the operation ring 16 is rotated for focusing, the first slide ring 22 is also rotated through the engagement of pin 30 and linear slot 18. Since the ring 22 is in screw-engagement with the inner barrel 14 in the above-mentioned manner, the first slide ring 22 axially moves while rotating about the optical axis. The rotational movement of the first slide ring 22 causes the second slide ring 32 to move in the direction along the optical axis relative to the first slide ring 22 in an amount of distance determined by the screw-engagement between the first and second slide rings. Therefore, the total moved distance of the second slide ring 32 in the direction of the optical axis is the sum of the moved axial distance of the first slide ring 22 and the distance of the above relative movement. In this manner, with the rotation of the operation ring 16 in one direction, the second slide ring 32 moves toward the object side to bring the optical system into focus for infinity ($\infty$), and with the rotation of the operation ring in the opposite direction the second slide ring moves toward the image side to bring the optical system into focus for close distance as shown in FIG. 3.

In FIG. 3, the phantom line suggests the position of the optical system in focus for infinity. Assuming that the lead of the male screw of the first slide ring 22 and the female screw of the inner barrel 14 is D1, the maximum moved distance of the ring 22, $B = D1 \times \theta°/360°$ wherein $\theta°$ is the angle of rotation of the operation ring 16. The axial movement of the first slide ring 22 is allowable within a range limited by an inside surface 10a of the stationary lens barrel 10 and an end surface 10b of the tube supporting the stationary lens L44. In other words, the allowable movement of the first slide ring 22 is limited within a relatively narrow range by the optical system and the supporting structure therefor. Compared with the maximum moved distance B of the first slide ring 22, the maximum moved distance A of the second slide ring 32 is very large, which is $(D1+D2) \times \theta°/360°$ wherein D2 is the lead of the female screw of the ring 22 and the male screw of the ring 32. This means that a large movement of the second slide ring can be attained by a small movement of the first slide ring which connects the operation ring with the mechanism within the inner barrel 14. Within the inner barrel the moving lenses L42 and L43 must be moved over a relatively large distance sufficient to cover the focusing range of from infinity to close distance. According to the above embodiment, the necessary large amount of movement for focusing can be obtained by a relatively small amount of movement of the first slide ring 22.

Further, according to the above embodiment, the focusing operation member 16 can be positioned rearward of the first catoptric system L2. Therefore, the force required to rotate the operation member for focusing is very small. In addition, this arrangement enables reducing the weight of the lens barrel itself and therefore the manufacturing cost thereof.

I claim:
1. Optical apparatus comprising:
   optical means including a first dioptric system, a first catoptric system having an opening formed at a middle portion thereof including an optical axis and an annular reflective surface disposed to reflect a beam of light coming from an object and transmitted through said first dioptric system, a second catoptric system located on the optical axis in the vicinity of said first dioptric system and disposed to reflect the beam from said first catoptric system toward said opening, and a second dioptric system having a moving lens group to be moved in the direction of the optical axis in an area near said opening and disposed to transmit the beam from said second catoptric system;
   a stationary cylindrical member holding said first dioptric system and said first catoptric system;
   a movable cylindrical member provided in said stationary cylindrical member and holding said moving lens group, said movable cylindrical member having a diameter smaller than a diameter of said opening of said first catoptric system and being movable in the direction of the optical axis passing through said opening of said first catoptric system;
   a moving member provided to be moved in the direction of the optical axis;
   transmission means for moving said movable cylindrical member in response to said moving member, said transmission means including movement expanding means for moving said movable cylindrical member over an expanded distance relative to the moved distance of said moving member; and
   operating means for moving said moving member.

2. Optical apparatus according to claim 1, wherein said transmission means extends into said opening of said first catoptric system.

3. Optical apparatus according to claim 1, wherein said moving lens group as moved for focusing to the object.

4. Optical apparatus according to claim 1, wherein said operating means includes an operation ring member provided on the outer circumference of said stationary cylindrical member and rotatable about said optical axis.

5. Optical apparatus according to claim 4, wherein said stationary cylindrical member has a large diameter at the object side and a small diameter at the image side, and said operating ring member is provided on the outer circumference of said small diameter.

6. Optical apparatus according to claim 1, wherein said movdng member is rotated about said optical axis by said operating means, and said transmission means includes a first screw-engagement provided between said stationary cylindrical member and said moving member and a second screw-engagement provided between said moving member and said movable cylindrical member.

7. Optical apparatus according to claim 1 further comprising an inner cylindrical member fixed to said stationary cylindrical member and extending through said opening of said first catoptric system, and wherein said movable cylindrical member is provided in said inner cylindrical member.

8. Optical apparatus according to claim 7, wherein said moving member is rotated about said optical axis by said operating means, and said transmission means includes a first screw-engagement provided between said inner cylindrical member and said moving member and a second screw-engagement provided between said moving member and said movable cylindrical member.

9. Optical apparatus comprising:
optical means including a first dioptric system, a first catoptric system having an opening formed at a middle portion thereof including an optical axis and an annular reflective surface disposed to reflect a beam of light coming from an object and transmitted through said first dioptric system, a second catoptric system located on the optical axis in the vicinity of said first dioptric system and disposed to reflect the beam from said first catoptric system toward said opening, and a second dioptric system having a moving lens group to be moved in the direction of the optical axis in an area near said opening and disposed to transmit the beam from said second catoptric system;
a stationary cylindrical member holding said first dioptric system and said first catoptric system;
an inner cylindrical member fixed to said stationary cylindrical member and extending through said opening of said first catoptric system;
a movable cylindrical menber having a portion provided in said inner cylindrical member and holding said moving lens group;
operating means for rotating said movable cylindrical member; and
screw means for moving said movable cylindrical member in the direction of said optical axis in response to said operating means, said screw means having an inner screw formed on an inner surface of said inner cylindrical member and an outer screw adapted to be engaged with said inner screw and formed on an outer surface of said portion of said movable cylindrical member.

10. Optical apparatus according to claim 9, wherein said movable cylindrical member includes a lens holding member holding said moving lens group and a moving member provided to be rotated about said optical axis by said operating means, and said screw means includes a first screw-engagement provided between said inner cylindrical member and said moving member and a second screw-engagement provided between said moving member and said lens holding member.

11. Optical apparatus according to claim 10, wherein said movable cylindrical member further includes means for inhibiting the rotation of said lens holding member.

* * * * *